United States Patent [19]

Barner

[11] Patent Number: 4,838,112

[45] Date of Patent: Jun. 13, 1989

[54] MULTIPLE RATE FORCE AND MOVEMENT ACTUATOR

[75] Inventor: William H. Barner, Laguna Beach, Calif.

[73] Assignee: Inotek-Westmoreland Joint Venture, Mission Viejo, Calif.

[21] Appl. No.: 91,904

[22] Filed: Sep. 1, 1987

[51] Int. Cl.$^4$ .............................. G05G 5/06; F16F 1/34
[52] U.S. Cl. .................................... 74/527; 74/100 P; 74/110; 267/161
[58] Field of Search ............... 74/2, 97, 100 R, 100 P, 74/527, 584, 110; 267/157, 158, 161; 200/77

[56] References Cited

U.S. PATENT DOCUMENTS

| | | | |
|---|---|---|---|
| 2,329,182 | 9/1943 | Boynton | 74/100 |
| 2,420,913 | 5/1947 | Schellman | 74/100 |
| 2,753,969 | 7/1956 | Chung | 74/584 |
| 2,826,286 | 3/1958 | Boyce | 74/527 |
| 3,127,786 | 4/1964 | Wooley | 74/527 |
| 3,275,376 | 9/1966 | Prox | 74/527 |
| 3,370,143 | 2/1968 | Barney | 74/527 |
| 3,417,355 | 12/1968 | Clason | 74/527 |
| 3,740,045 | 6/1973 | Westmoreland | 74/2 |

FOREIGN PATENT DOCUMENTS 60-155022  8/1985  Japan .................................... 267/158

Primary Examiner—Allan D. Herrmann
Attorney, Agent, or Firm—George J. Netter

[57] ABSTRACT

The inwardly facing portions of annular springs adjacent the inner edge thereof are formed into two or more regions of predetermined angular or curved slopes and radial extent. When the peak of a shaft cam passes an annular set of ball bearings between the springs, the loaded springs unload at a rate determined by each region slope and the radial extent of the regions to consecutively drive the shaft at corresponding rates and forces. To precisely obtain the desired spring characteristics, a composite spring can be used formed from a steel spring sandwiched together with a plastic member (e.g., nylon).

5 Claims, 2 Drawing Sheets

MULTIPLE RATE FORCE AND MOVEMENT ACTUATOR

The present application pertains to a force and movement actuator, and, more particularly, to such an actuator for providing predetermined constant rate or multiple rate forces and movements.

BACKGROUND

U.S. Pat. No. 3,740,045, "Precision Disc Springs" by J. C. Westmoreland, describes a disc spring arrangement in which a pair of annular disc spring elements are arranged parallel to one another with their outer edges maintained at a first spaced arrangement and their inner edges at a second and greater distance. A plurality of ball bearings contactingly engage the inner edges of the annular spring elements, and a shaft extends through the central opening of the spring elements having a circumferential cam which on moving past the ball bearings, engages the ball bearings and forces them into the space between the spring elements. This action produces a reactive force which, when the cam passes the point of maximum ball bearing extension, drives the shaft further in the same direction at a rate and with a pulselike force depending upon the spring characteristics. Return of the shaft back along the same path causes a similar action in the reverse direction.

Although the patented device is excellent for providing a pulsed shaft actuation, there are many circumstances in which it is desirable to be able to provide a controlled and predetermined rate or plurality of different movement and force actuation rates.

OBJECTS AND SUMMARY OF THE INVENTION

It is therefore a primary purpose and object of the invention to provide an improved spring arrangement for effecting constant or different predetermined reaction forces at individual prescribed rates for actuating a member.

A further object is the provision of a composite spring arrangement including plastic and metal parts.

In accordance with the present invention, there is provided a pair of generally annular leaf springs arranged in parallel, spaced apart relation, the outermost edge portions of which are restrained from moving outwardly while the spring inner edge portions are free to move at 90 degrees to the annular plane. A shaft is arranged to extend through the spring annular opening and includes, a circumferentially outwardly extending cam. A set of ball bearings having diameters exceeding the inner edge spacing of the springs contactingly engage the springs inner edges and are driven into the space between the springs distending them in opposite directions as the shaft cam contacts the inner edge of the bearings.

The inwardly facing portions of the springs adjacent the inner edge thereof are formed into two or more regions of predetermined angular or curved slopes and radial extent. By this arrangement, when the peak of the shaft cam passes the ball bearings, the loaded springs unload at a rate determined by each region slope and the radial extent of the regions to consecutively drive the shaft at corresponding rates and forces.

It has been found that desired spring characteristics for annular springs not permitted to exceed prescribed dimensions, may not be obtainable in a single-metal material (e.g., steel, beryllium copper). In this case, it is preferable in order to precisely obtain the desired spring characteristics that a composite spring be formed from a steel spring sandwiched together with a plastic (e.g., nylon) spring.

DESCRIPTION OF A PREFERRED EMBODIMENT

Figure 1:
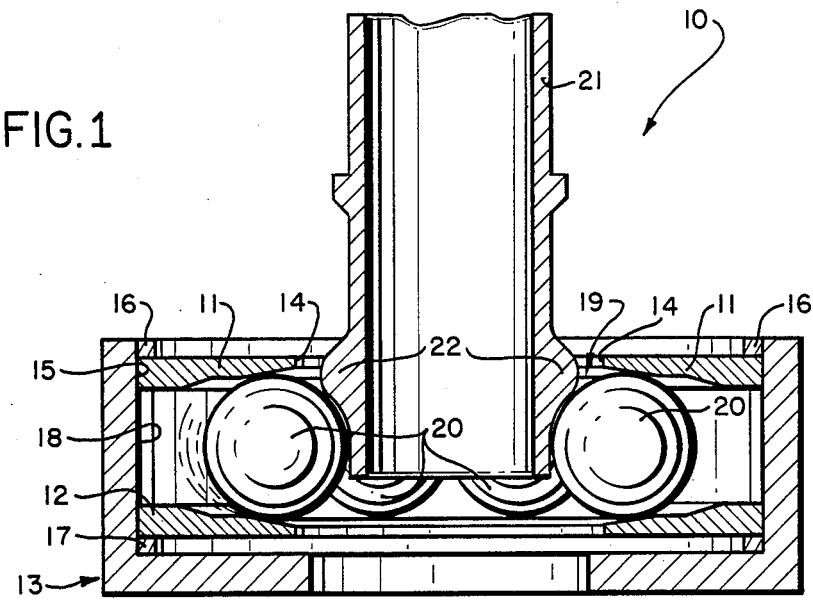
FIG. 1 is a side elevational, sectional view of the actuator and drive shaft of this invention.
Figure 2:
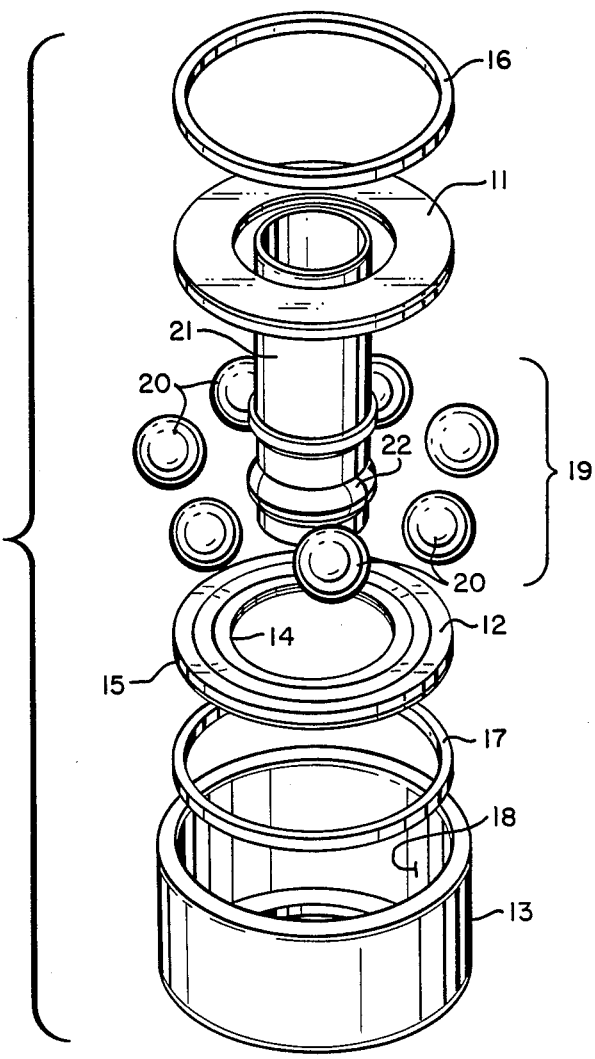
FIG. 2 is an exploded depiction of the parts of the actuator of FIG. 1.

With reference now to the drawings, and particularly FIG. 1, the actuator 10 is seen to include first and second generally annular actuator leaf springs 11 and 12 of identical construction held in a parallel, spaced apart relation within an actuator housing 13. More particularly, the springs are radially beveled with respect to the major plane of the spring such that the inner circular edge 14 lies in a plane spaced from and parallel to a plane through the outer spring edge 15.

The actuator housing 13 consists of a pair of rings 16 and 17 secured to an outer edge wall 18 and having inner circumferentially extending surfaces contacting the outwardly facing outer edges of the springs 11 and 12 holding them at the desired spaced apart relationship.

A circular race 19 of ball bearings 20 is mounted just within the spring inner edges without exerting a significant force thereon. The diameter of each ball bearing is slightly greater than the spaced apart relationship of the springs such that on a ball bearing moving between the springs, the springs will be distended by the ball bearings developing a reactive spring force urging the bearings radially outwardly from between the springs.

A shaft 21 is mounted for reciprocal movement along the center-line through the bore of the bearing race 19 and the annular springs 11 and 12. The uniform diameter portion of the shaft is such as to merely contact each of the ball bearings when the bearings are barely received within the inner edges of the springs. A circular cam 22 carried by the shaft extends circumferentially about the shaft and has an outwardmost extension point sufficient to engage the ball bearings and move them inwardly between the annular springs causing the springs to distend and exert a reaction force against the ball bearings. As the shaft moves the cam past the ball bearings, the ball bearings are at first urged outwardly distending the springs and then as the cam passes its point of maximum extension, the reaction spring force causes the ball bearings to move towards the shaft exerting pressure on the backside of the cam and producing further movement of the shaft in the same direction at a rate and with a force determined by the spring reaction.

Figure 3:
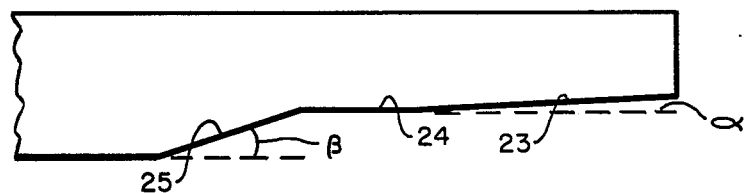
FIG. 3 an enlarged side elevational view of one form of actuator spring showing two regions for providing predetermined reaction spring force and movement.
Figure 4:
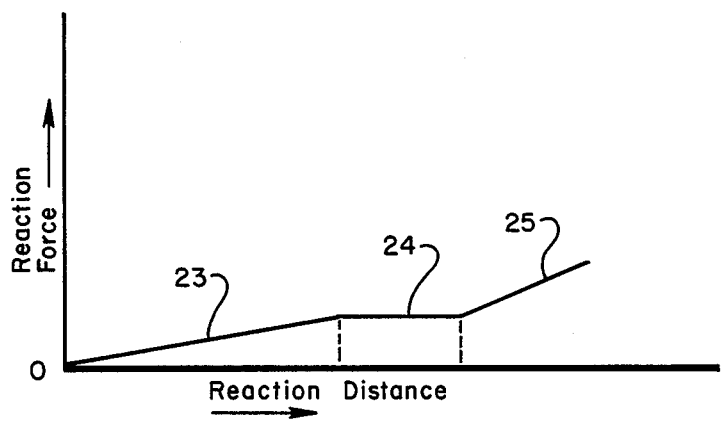
FIG. 4 is a graph showing rate and force provided by the springs of FIG. 3.

Turning now to FIG. 3, it is seen that the facing surfaces of the actuator spring inner edge portions are modified so as to provide a first or entrance region 23 presenting a ramp to the ball bearings of predetermined angular amount relative to a center line or center plane between the springs. Moving inwardly from the first region, there is a dwell 24 where radial movement of the ball bearings therealong will produce no change in distention of the springs. Next, is a second region 25 arranged at a further and different angle with respect to the center line or plane between the springs and which, as the ball bearings move thereagainst, produces a second and different loading of the spring.

When the cam passes its peak spring loading point, the annular springs then begin to unload moving the ball bearings outwardly of the spring at a rate and force determined by the slope and the relative spatial dimensions between the second region 25 followed by a dwell at constant force, after which there is a further and different force application and rate of movement applied to the shaft as determined by the spring slope in region 23.

Figure 5:
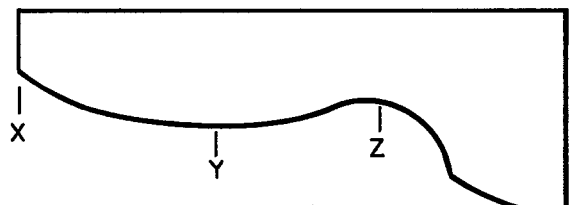
FIG. 5 is a side elevational, sectional view of an actuator spring for providing a constant force.

Turning now to FIG. 5, there is shown the profile of an actuator spring for providing a substantially constant reaction force against the cam 22, and, therefore, to the shaft 21. As in the FIG. 3 form there are two actuators with the corresponding curve or beveled parts lying directly opposite one another. As a ball bearing 20 moves inwardly between the actuator springs (i.e., from x y) it produces a steadily increasing reaction force in the springs. From y to z the surface is curved radially into the spring at very much the same bevel as x to y. However, when the spring is distended to its maximum with a bearing positioned at point y the curve y to z is much less and actually will provide a substantially constant reaction force against the bearing through z to y.

Figure 6:
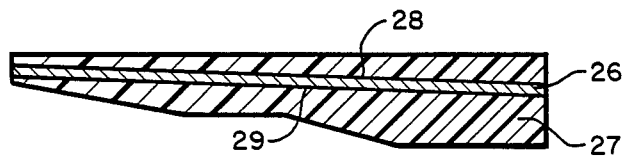
FIG. 6 is a sectional elevational view of an actuator spring of composite construction.

As can be best seen in FIG. 6, a preferred composite construction for an actuator 11 and 12 is a metal spring 26 (e.g., steel) molded into a body plastic 27 (e.g., nylon), forming a unitary spring assembly. By varying the relative thicknesses of the metal and plastic body, as well as changing the materials themselves, a composite spring can be obtained having a wide range of desired physical characteristics.

To compensate for the modulus of elasticity difference between plastic and metal, thin layers 28 and 29 of an elastomeric bonds the plastic and metal surface to one another. A steel spring has a much faster return rate than nylon so that in the usual case the nylon thickness will be many times that of the steel spring (e.g., ×10).

The actuator described herein can be advantageously employed in any number of different applications wherever it is desirable to positively thrust and position a shaft at a constant or a plurality of consecutive predetermined rates and forces. Such an actuator can be usefully employed in positively setting valves in a fluid pump, for example, and where the rate and force must be kept within prescribed limits to prevent "chattering" or "hammering".

As can be seen best in FIG. 1, the circular cam 22 on the shaft 21 in cross-section is seen to be symmetrical in having a concavedly curved entrance surface generally matching that of a ball bearing 20 and a convexedly curved maximum extension surface. Although this cam shape has been found fully satisfactory for the described purposes, there may be other circumstances where "fine tuning" of operation may be obtained by changing the cam configuration. For example, it may be desirable that the cam slope (and curvature) on one side differs from that on the other side providing different operation depending upon which side of the cam is active.

I claim:

1. A selectively controlled rate and force actuator having a pair of spaced apart annular leaf springs, a housing for holding the outer edges of said annular springs and leaving the inner edges free to distend, a plurality of ball bearings arranged in a closed path adjacent the inner edges of the springs, a shaft located within bearings and annular spring bore adapted for reciprocating movement, and a cam carried by said shaft for engaging the ball bearings and moving them between the springs to reactively distend the springs outwardly, comprising:

the surface of each spring facing the other spring having,
      a first region adjacent the spring inner edge of a first predetermined radially extending curved surface configuration;
      a second region adjacent the first region having a second predetermined curved surface configuration differing from said first region surface configuration; and
      said first and second configurations effecting a substantially constant reactive force urging the ball bearings toward the shaft.

2. A selectively controlled rate and force actuator having a pair of spaced apart annular leaf springs, a housing for holding the outer edges of said annular springs and leaving the inner edges free to distend, a plurality of ball bearings arranged in a closed path adjacent the inner edges of the springs, a shaft located within bearings and annular spring bore adapted for reciprocating movement, and a cam carried by said shaft for engaging the ball bearings and moving them between the springs to reactively distend the springs outwardly, comprising:

each annular spring is constructed of a nylon annular body within which a spring steel annular body is embedded, and an elastomeric film is adheringly positioned between the spring steel and nylon bodies;
   the surface of each spring facing the other spring having,
      a first region adjacent the spring inner edge of a first predetermined radially extending surface configuration, and
      a second region adjacent the first region having a second predetermined surface configuration differing from said first region surface configuration.

3. A selectively controlled rate and force actuator having a pair of spaced apart annular leaf springs, a housing for holding the outer edges of said annular springs and leaving the inner edges free to distend, a plurality of ball bearings arranged in a closed path adjacent the inner edges of the springs, a shaft located within bearings and annular spring bore adapted for reciprocating movement, and a cam carried by said shaft for engaging the ball bearings and moving them between the springs to reactively distend the springs outwardly, comprising:

each annular spring being constructed of a nylon annular body within which a spring steel annular body is embedded;
   the surface of each spring facing the other spring having,
      a first region adjacent the spring inner edge of a first predetermined radially extending surface configuration, and a second region adjacent the first region having a second predetermined surface configuration differing from said first region surface configuration;

said curved surface configuration effecting a substantially constant reactive force urging the ball bearings toward the shaft.

4. A selectively controlled rate and force actuator having a pair of spaced apart annular leak springs, a housing for holding the outer edges of said annular springs and leaving the inner edges free to distend, a plurality of ball bearings arranged in a closed path adjacent the inner edges of the springs, a shaft located within bearings and annular spring bore adapted for reciprocating movement, and a cam carried by said shaft for engaging the ball bearings and moving them between the springs to reactively distend the springs outwardly, comprising:

each annular spring being constructed of a nylon annular body within which a spring steel annular body is concentrically embedded, and an elastomeric film is adheringly positioned between the spring steel and nylon bodies;

the surface of each spring facing the other spring having, a first region adjacent the spring inner edge of a first predetermined radially extending surface configuration;

a second region adjacent the first region having a second predetermined surface configuration differing from said first region surface configuration; and means carried by the housing for adjustably positioning the spacing of the annular springs with respect to each other and produce corresponding adjustments of the reactive force on the ball bearings.

5. A selectively controlled rate and force actuator having a pair of spaced apart annular leaf springs, a housing for holding the outer edges of said annular springs and leaving the inner edges free to distend, a plurality of ball bearings arranged in a closed path adjacent the inner edges of the springs, a shaft located within bearings and annular spring bore adapted for reciprocating movement, and a cam carried by said shaft for engaging the ball bearings and moving them between the springs to reactively distend the springs outwardly, comprising:

the surface of each spring facing the other spring having, a first region adjacent the spring inner edge of a first predetermined radially extending curved surface configuration;

a second region adjacent the first region having a second predetermined curved surface configuration differing from said first region surface configuration;

said first and second curved surface configuration effecting a substantially constant reactive force urging the ball bearings toward the shaft; and means carried by the housing for adjustably positioning the spacing of the annular springs with respect to each other and produce corresponding adjustments of the reactive force on the ball bearings.

* * * * *